July 23, 1935.　　　　S. L. GINSBERG　　　　2,008,906
INSULATED CONTAINER FOR FROZEN FOOD
Filed May 19, 1932　　　2 Sheets-Sheet 1
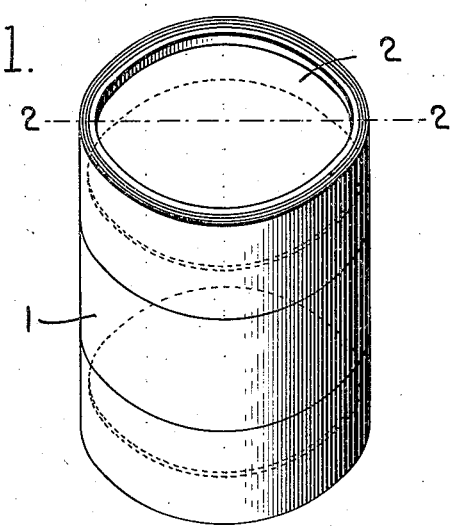
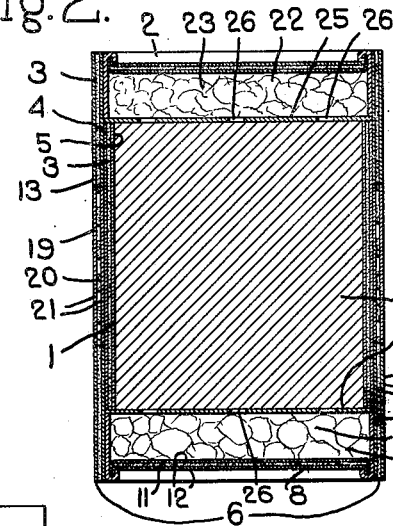
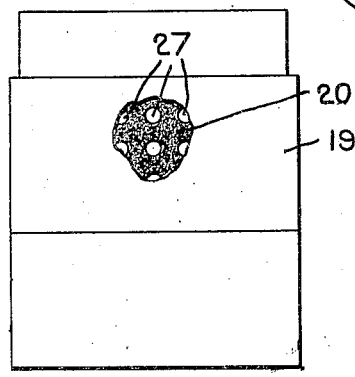
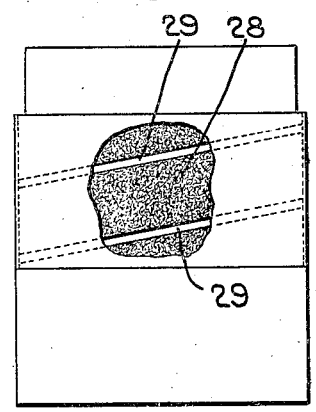
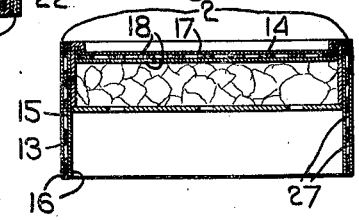
Inventor.
Samuel L. Ginsberg
by Heard Smith & Tennant.
Attys.

July 23, 1935.  S. L. GINSBERG  2,008,906
INSULATED CONTAINER FOR FROZEN FOOD
Filed May 19, 1932  2 Sheets-Sheet 2

Inventor.
Samuel L. Ginsberg
by Heard Smith & Tennant.
Attys.

Patented July 23, 1935

2,008,906

UNITED STATES PATENT OFFICE 2,008,906

INSULATED CONTAINER FOR FROZEN FOOD

Samuel L. Ginsberg, Jamaica Plain, Mass.

Application May 19, 1932, Serial No. 612,206

1 Claim. (Cl. 229—3.5)

This invention relates to insulated containers which are designed to hold frozen food such as ice cream and the like and one of the objects of the invention is to provide a novel container which has excellent insulating properties so that it will maintain the frozen contents in a frozen state for a considerable time.

A container embodying this invention is formed with plural-ply walls presenting an intermediate layer of felt interposed between two layers or plies of paper or other material and provided with air pockets to increase its insulating properties. A container made with walls of this character has excellent insulating properties so that if the container is filled with a frozen food the latter will remain frozen for a considerable time. If desired, the container may be made with a compartment for receiving so-called "dry ice" (frozen carbon-dioxide), which compartment communicates with the interior of the container. The presence of the dry ice will, of course, increase the length of time which the contents of the container will remain frozen.

In order to give an understanding of the invention I have illustrated in the drawings some selected embodiments thereof which will now be described after which the novel features will be pointed out in the appended claim.

Fig. 1 is a perspective view of a container embodying my invention;

Fig. 2 is a section on the line 2—2 Fig. 1;

Fig. 3 is a side view of a container with the cover removed;

Fig. 4 is a sectional view of the cover containing the dry ice compartment;

Fig. 5 is a view similar to Fig. 3 but showing a different embodiment of the invention;

Figure 6:
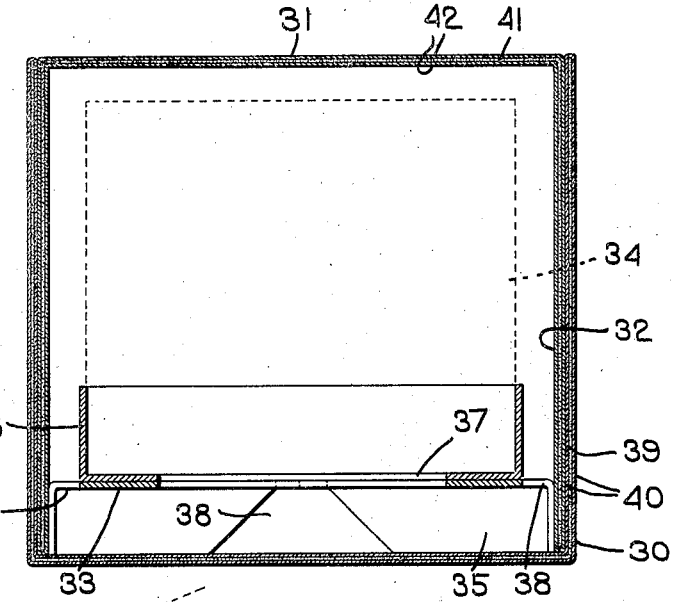
Fig. 6 is a vertical sectional view of a container of different form but embodying the invention.

The container shown in Figs. 1 and 2 is provided with a body portion 1 which is open at one end and is adapted to be closed by a cover 2. The walls of the body portion 1 and also of the cover are made of a plurality of plies comprising an intermediate ply 3 of felt which is interposed between two plies 4 and 5 of paper or other material, these three plies preferably being adhesively united together.

The container body may be one in which the bottom is permanently secured to the side walls or it may be of the type wherein both ends of the container are removable. The latter is the construction illustrated in Fig. 2 and the bottom of the container, which is indicated 6, is constructed similar to the cover 2 and is removably applied to the container body. With this construction the container body will be open at both ends, one end being closed by the removable bottom 6 and the other by the cover 2. If the container is cylindrical in shape as illustrated in the drawings then the container body will be in the form of an open-ended cylinder.

The bottom 6 is shown as formed with a skirt portion 7 into which the end of the body is received and the side walls or skirt portion 7 and the end 8 of the bottom 6 are each formed of a plurality of plies comprising an intermediate ply of felt interposed between two other plies of paper or other material. The felt ply or layer in the skirt portion 7 is indicated at 9 and the two layers of paper or other material at 10. The felt layer of the end 8 is indicated at 11 and the two layers of paper or other material between which the felt layer 11 is interposed are indicated at 12.

The cover 2 is also formed with a skirt portion 13 which fits over the end of the container body and both this skirt portion and the top end 14 of the cover preferably have the plural-ply construction above described comprising a central or intermediate ply of felt interposed between two plies of paper or other material. The felt ply in the skirt portion 13 is indicated at 15 and the two other plies at 16 and the felt ply in the top portion is indicated at 17 and the two other plies at 18.

In order to increase the insulating qualities of the container body I may employ a sleeve 19 which encircles the portion of the body exposed between the skirt portion 7 of the bottom and the skirt portion 13 of the cover. This sleeve 19 is shown as having plural-ply construction, it having a central layer or ply 20 of felt which is interposed between two other layers 21 of paper or other material. If desired, the cover 2 and also the bottom member 6 may be formed with a compartment 22 to receive dry ice 23. Each compartment 22 is shown as separated from the food-receiving compartment 24 of the container by means of a partition 25, the latter having openings 26 therein which provide communication between the compartment 22 for the dry ice and the compartment 24 for the food.

As a further means of increasing the insulating properties of the cover I propose to form the felt layers with air pockets. One way in which this can be done is to provide a felt layer with a plurality of openings or perforations 27 and inasmuch as the felt is confined between the other layers the result will be a plurality of air pockets or cells within the wall of the container.

Another way of securing such air pockets or cells is to form the felt ply of the wall with strips of felt 28 which may be wound spirally about the container but separated slightly from each other thereby providing the air spaces 29. This cellular construction may be employed in the walls of the container and in the cover and in the bottom.

While I have illustrated the container as having compartments 22 to receive some refrigerating material, such for instance, as dry ice, yet the invention is not limited to the use of such compartments as a container having the three-ply wall construction but without the pockets for containing refrigerant will come within the scope of the invention.

Figure 7:
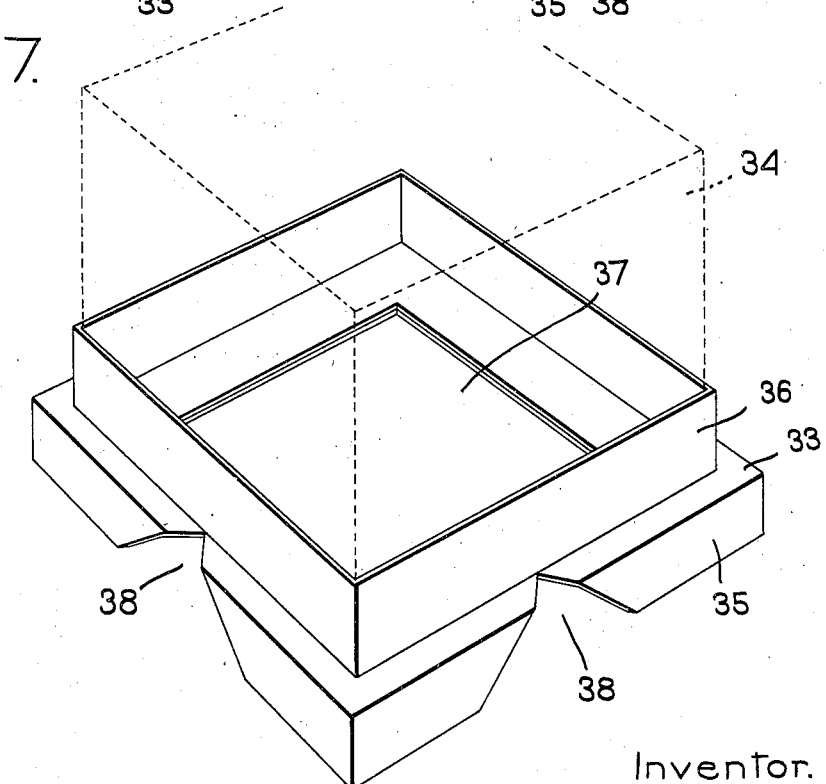
Fig. 7 is a perspective view of the tray or support shown in Fig. 6 on which a package of ice cream or other frozen material may be supported.

In Figs. 6 and 7 I have illustrated a different form of container embodying my invention which is designed to receive ice cream or other food in the package form. The container illustrated comprises a container body 30 and a cover member 31 which has a long skirt portion 32 adapted to telescope into the container body. Situated within the container may be one or more tray members such as indicated generally at 33, each of which is designed to receive a carton 34, that may be a carton containing ice cream in brick form or a carton containing any other frozen food.

This tray 33 is of a shape to fit within the container and is provided with a depending supporting flange 35 and with an upstanding curb 36 within which the package 34 is adapted to be received. The tray is shown as skeleton in form, it having a central opening 37. The supporting flange 35 is illustrated as being cut away at 38 and the curb 36 is shown as being somewhat smaller in diameter than the flange 35.

In using a container of this form the tray will be set into the container and then the package 34 of ice cream or other food will be placed in the tray as shown in dotted lines in the drawings and the cover 31 is then applied thereby closing the container.

The walls of the container and of the cover will preferably be made of the three-ply construction above described, that is with the central ply of felt interposed between two plies of paper or other material. The central felt ply of the container 30 is indicated at 39 and the other plies between which it is interposed are indicated at 40. The intermediate felt ply of the cover is indicated at 41 and the other plies between which the felt ply 41 is interposed are indicated at 42.

A container having this construction has excellent insulating properties so that any frozen food placed in the tray will remain in its frozen condition for a long time. If desired, it would be possible to use dry ice or other refrigerant in the container thereby prolonging the length of time which the food will remain in its frozen condition. The notches 38 constitute means for circulation of air in the container to provide maximum exposure of the contents to the cooling effect of the dry ice.

I claim:

A cylindrical insulated container having a three-ply wall presenting inner and outer layers of paper forming the inner and outer surfaces of the wall and a strip of felt extending spirally about the cylindrical wall of the container between the layers of paper with each turn of the spiral spaced from adjacent turns thereby providing a continuous spiral-shaped air pocket between said turns, the entire contacting surfaces of the felt and paper layers being adhesively united and the spacing between the strips of felt constituting an air pocket.

SAMUEL L. GINSBERG.